US008631135B2

(12) United States Patent
Aalto et al.

(10) Patent No.: US 8,631,135 B2
(45) Date of Patent: *Jan. 14, 2014

(54) INTERNET/INTRANET ACCESS MECHANISM

(75) Inventors: Mika M Aalto, Ratingen (GR); Maria L Lakso, Espoo (FI); Kai Nyman, Espoo (FI)

(73) Assignee: Wi-LAN, Inc., Ottawa, Ontario (CA)

( * ) Notice: Subject to any disclaimer, the term of this patent is extended or adjusted under 35 U.S.C. 154(b) by 560 days.

This patent is subject to a terminal disclaimer.

(21) Appl. No.: 12/474,129

(22) Filed: May 28, 2009

(65) Prior Publication Data

US 2009/0232145 A1 Sep. 17, 2009

Related U.S. Application Data

(63) Continuation of application No. 09/762,226, filed as application No. PCT/FI99/00652 on Aug. 5, 1999, now Pat. No. 7,606,907.

(30) Foreign Application Priority Data

Aug. 6, 1998 (FI) .......................................... 981708

(51) Int. Cl.
G06F 15/16 (2006.01)
G06F 9/00 (2006.01)
G06F 17/00 (2006.01)

(52) U.S. Cl.
USPC .............................. 709/227; 709/228; 726/15

(58) Field of Classification Search
None
See application file for complete search history.

(56) References Cited

U.S. PATENT DOCUMENTS

| 5,915,008 A | 6/1999 | Dulman |
| 5,940,598 A | 8/1999 | Strauss et al. |
| 6,035,340 A * | 3/2000 | Fischer et al. ............... 709/249 |
| 6,061,650 A | 5/2000 | Malkin et al. |
| 6,084,892 A * | 7/2000 | Benash et al. ............... 370/401 |
| 6,151,628 A * | 11/2000 | Xu et al. ....................... 709/225 |
| 6,490,273 B1 * | 12/2002 | DeNap et al. ................ 370/352 |
| 7,606,907 B1 * | 10/2009 | Aalto et al. .................. 709/227 |

FOREIGN PATENT DOCUMENTS

| EP | 0700231 A3 | 11/2000 |
| EP | 0873038 A3 | 10/2003 |
| WO | 9638962 A1 | 5/1996 |
| WO | 9836608 A1 | 8/1998 |

OTHER PUBLICATIONS

Nilsson, P. et al., Anx-High-speed Internet access, Ericsson Review, Internet Access Services, 1998, pp. 24-31.

(Continued)

*Primary Examiner* — Azizul Choudhury
(74) *Attorney, Agent, or Firm* — Volpe and Koenig, P.C.

(57) ABSTRACT

A method connects one of several customer premises equipment (CPE) via an ATM network to one of several service providers (SP). Each CPE is connected to the ATM network via a corresponding network termination point (NT). There is an access server function (ASF), having a permanent virtual connection (PVC) to each NT and a connection to each SP. A tunneling protocol is established on the permanent virtual connection between each NT and the ASF. The tunneling protocol is able to support an integrated signaling protocol. The CPE or its user select selects an appropriate SP by using the integrated signaling protocol. Routing from the CPE to the selected SP is performed by the ASF. The ASF connects the CPE to the selected SP using the integrated signaling protocol.

22 Claims, 1 Drawing Sheet

(56) References Cited

OTHER PUBLICATIONS

Verbiest, W. "High Speed Internet Access Over ADSL: Making It Happen", Alcatel Communications Reveiw 4th Quarter 1997 pp. 280-286.

Huang, N. et al. "Virtual LAN Internetworking over ATM Networks for Mobile Stations" Apr. 1997, IEEE, vol. 3, pp. 1397-1404.

Jaeger, R. et al. "Performance Management Issues of Currently Operated ATM Enterprise Networks", Jan. 1996, IEEE, vol. 34, Issue 1, p. 70-76.

\* cited by examiner

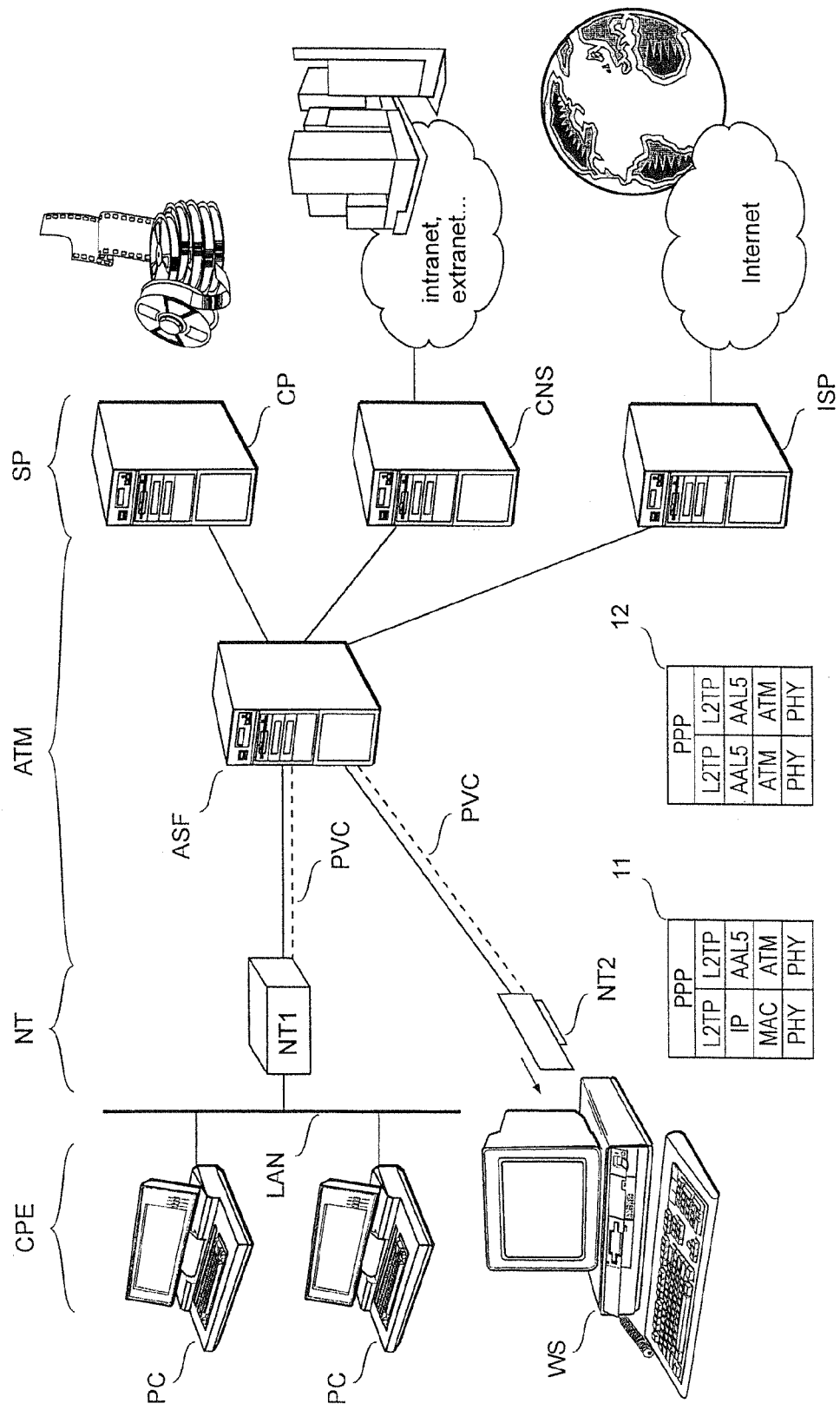

INTERNET/INTRANET ACCESS MECHANISM

This application is a continuation of parent U.S. application Ser. No. 09/762,226 filed on Mar. 7, 2001. now U.S. Pat. No. 7,606,907 The entire disclosure of the prior application is hereby incorporated by reference herein in its entirety.

BACKGROUND OF THE INVENTION

The present disclosure relates to a mechanism for accessing the Internet via an ATM (Asynchronous Transfer Mode) network. Within the context of this application, 'Internet' should be interpreted broadly to cover any large-area networks using Internet Protocols (IP). Especially it is the applicant's intention to include future developments, such as Internet 2 or NGI ('Next generation Internet'), and corporate networks, commonly referred to as intranets or extranets.

A person designing an Internet access mechanism faces several issues, such as interoperability, security, billing, economic use of IP addresses, and how to make the best use of installed equipment, etc.

From references [1, Kwok et al.] and [2, Nilsson et al.] are known Internet access mechanisms for connecting each of several customer premises equipment (abbreviated "CPE") via an ATM network to one of several service providers (SP). The concept of service provider comprises Internet service providers (ISP), content providers (CP, for video-on-demand, etc.), and corporate network servers (CNS, for telecommuting, etc.)

Referring to FIG. 1, CPEs are connected to the ATM network at network termination points (NT). A typical NT, such as NT1 in FIG. 1, is a network gateway having a network interface for the customer's local area network, LAN, and another interface towards the ATM network. Alternatively, a personal computer PC or a workstation WS can be connected directly (without a LAN) to the ATM network by means of an ATM/ADSL adapter card (shown as NT2), which in this case is the NT. In both cases, there is a well-defined NT for each CPE (although one NT may serve several CPEs). According to both cited references, the network comprises an access server function, or ASF, having a connection to each NT and each SP such that each NT has a permanent connection or a permanent virtual connection to the ASF. The wording 'access server function' implies that the ASF can be a dedicated network element or it can be integrated into or co-located with another network element, such as an ATM switch. In the cited references, the ASF has been referred to as an 'access node'/'DSLAM' (digital subscriber line access multiplexer) or an 'edge router'. It should be noted that the difference between 'permanent connection' and 'permanent virtual connection' has become rather blurred and later in this application, only 'permanent virtual connection' (PVC) will be used.

A problem of the known Internet access mechanisms is that they do not give a satisfactory answer to following problem: How can a specific end-user be connected to the desired service provider with a minimal number of permanent virtual circuits (PVCs) with a possibility of end-user authentication taking place only at the ends of the PVCs (not necessarily at the ASF)?

DISCLOSURE OF THE INVENTION

An object of the present disclosure is to solve or at least minimise the problem associated with the prior art access mechanisms. The object is achieved with a method and equipment which are characterized by what is disclosed in the attached independent claims. Preferred embodiments of the present disclosure are disclosed in the attached dependent claims.

The present disclosure is based on establishing a tunnelling protocol on the permanent virtual connection between each CPE or NT and the ASF, wherein the tunnelling protocol is able to support an integrated signalling protocol. Selecting an appropriate SP is based on the integrated signalling protocol. Routing to the selected SP is performed by the ASF. Finally, the ASF connects the CPE or NT to the selected SP using the integrated signalling protocol.

Within the context of this application, 'tunnelling protocol' refers to a protocol which allows creating and maintaining virtual private sessions via various network media such as IP, ATM, Frame Relay, etc. Correspondingly, 'integrated signalling protocol' (i.e. a signalling protocol integrated into the tunnelling protocol) refers to a control protocol which is used for creating, maintaining and releasing these sessions.

Implementation of the present disclosure, however, raises two new issues: the ATM network must provide non-ATM functions in the ASF, and, unless properly dimensioned, the ASF can be a performance bottleneck. Such non-ATM functions performed by the ASF include functions above the ATM layer for the user connections, namely SAR/AAL5, the entire tunnelling protocol and selecting the SP by L2 signalling. These functions require appropriate administration. After a careful study of the pros and cons of the present disclosure, it will be observed that there are situations where the advantages of the present disclosure justify the added complexity of the ASF.

According to a preferred embodiment of the present disclosure, one permanent virtual connection PVC is provided from the ASF to each SP. Alternatively, there is provided a pool of permanent virtual connections from the ASF to each SP. One PVC is allocated to each CPE from this pool. As a further option, it is possible to establish one switched virtual connection (SVC) from the ASF to each SP, on the basis of signalling which the ASF receives from the CPE via the tunnelling protocol.

The tunnelling protocol can be established only in response to detecting appropriate user activity in a CPE. Alternatively, the tunnelling protocol can be permanent and the integrated signalling is initiated and the user is authenticated only in response to detecting appropriate user activity in the CPE. According to a further preferred embodiment, the user is authenticated twice, first by the ASF using the tunnelling protocol, and then by the SP.

BRIEF DESCRIPTION OF THE DRAWINGS

The present disclosure will be described in more detail by means of preferred embodiments with reference to the appended drawing in which:

FIG. 1 is a block diagram illustrating the Internet/intranet access mechanism according to the present disclosure.

DETAILED DESCRIPTION OF THE INVENTION

FIG. 1 a is block diagram comprising several customer premises equipment CPE, connected via network termination points NT to an access server function ASF according to the present disclosure. The ASF can be a dedicated network element, or it can be integrated into or co-located with another network element, such as an ATM switch (which is known to a skilled person and not shown separately).

The ASF provides access from each CPE to several service providers SP, such as Internet service providers ISP, content providers CP and corporate networks CN. The present disclosure requires no changes to the construction or operation of the SP equipment. Instead, the present disclosure can be implemented in the ASF and the NT. There is preferably one permanent virtual connection (PVC) between each NT and the ASF.

In the embodiment shown in FIG. 1, there is one PVC from NT2 (in the workstation WS) to the ASF. Also, assuming that at least one of the personal computers PC is active, there is also a PVC from NT1 to the ASF. All the personal computers PC connected to the LAN share the PVC between NT1 and the ASF. According to a preferred embodiment of the present disclosure, there is a tunnelling protocol, such as L2TP (Layer 2 Tunnelling Protocol), on the PVC from each active PC to the NT. The tunnelling protocol combines the sessions and signalling from all active PCs into a single tunnel from the NT to the ASF. The tunnelling protocol must be able to support an integrated signalling protocol. The end user (i.e. the person using the CPE or a software agent being executed in the CPE) selects an appropriate SP by using the integrated signalling protocol. Routing to the selected SP is performed by the ASF. Finally, the ASF connects the CPE or NT to the selected SP using the integrated signalling protocol.

Reference 11 points to a preferred protocol stack at the NT and reference 12 points to a preferred protocol stack at the ASF. (The workstation WS connected to NT2 without a LAN needs a simpler protocol stack, consisting only of the right half of the protocol stack 11, i.e. PPP, L2TP, AAL5, ATM, and PHY.) Having point-to-point connectivity PPP over L2TP provides end-to-end security. In other words, it is not necessary for the ASF to authenticate the user, although the ATM operator may still choose to do so, in order to charge the subscriber for the duration of the session. However, even in this case, the end-user's choice of SP is not known to the ATM operator, which is a clear benefit to the owners of the SPs.

The preferred embodiment saves a considerable amount of PVCs over the prior art access mechanisms. Let us calculate an example case of 10 000 customers and 8 SPs and 20 ASFs (one ASF per 500 CPE). If all customers need access to all SPs, the prior art access mechanisms require a separate PVC for each customer/SP combination, i.e. in this example 8*10 000=80000 PVCs. In comparison, the mechanism according to the present disclosure requires a PVC only for each customer and each ASF/SP combination, i.e. 10 000+8*20=10 160 PVCs. (This number is not perfectly accurate since some ASF/SP connections can be switched virtual connections, SVC.)

According to an alternative embodiment of the present disclosure, there is a separate PVC from each active PC between the NT and the ASF. In this case, implementation of the NT is easier because the tunnels from the PCs do not have to be combined (instead, all tunnels pass from the PCs, over the LAN, through the NT to the ASF).

The ATM operator's billing can be based on the time there is a PVC between the customer and the ASF. The present disclosure simplifies this kind of billing because there is only one PVC from each customer. Also, when the customer changes the SP, a new PVC configuration is not needed.

Configuring and managing the NT device according to the present disclosure invention, like the device itself, is rather simple. Only its LAN interface and its ATM interface require configuration: an IP address, a subnet mask and an ATM PVC. The latter can be received automatically, using a technique known as ILMI (Interim Local Management Interface) as defined by ATM Forum UNI (User to Network Interface) 3.1.

ILMI supports bidirectional exchange of management information between UNI management entities related to the ATM layer and physical layer parameters. Correspondingly, the LAN interface can be configured automatically by a process known as DHCP (Dynamic Host Configuration Protocol), as defined by the Internet Software Consortium.

The description only illustrates preferred embodiments of the invention. The invention is not, however, limited to these examples, but it may vary within the scope of the appended claims.

REFERENCES

1. Kwok, Timothy et al: *An Interoperable End-to-End Broadband Service Architecture over ASDL Systems*, version 1.0, 3 Jun., 1997, available at address http://www.3com.com/xdsl/microwt.html at the priority date of this application.
2. Nilsson, Patrik et al: *Anx—High-speed Internet Access*, available at address http://www.ericsson.com/Review/er1b_98/art4/art4.html at the priority date of this application. The www address implies that reference 2 was printed in Ericsson Review magazine.

Both cited references are incorporated herein by reference.

The invention claimed is:

1. A method for use in an access server, wherein the access server is connected to a plurality of network termination (NT) points and at least one service provider (SP), and each of the plurality of NT points is associated with at least one customer premises equipment (CPE), the method comprising:
   multiplexing user data destined to the at least one CPE;
   communicating the multiplexed user data destined to the at least one CPE from the access server to a respective one of the plurality of NT points over a single permanent virtual connection;
   receiving user data originating from the at least one CPE from the respective one of the plurality of NT points over the single permanent virtual connection, wherein a tunneling protocol between the respective one of the plurality of NT points and the access server combines sessions and signaling from the at least one CPE into a single tunnel; and
   routing the user data originating from the at least one CPE to at least one SP selected from the at least one SP using an integrated signaling protocol between the at least one CPE and the access server based on a SP indication received from the at least one CPE.

2. The method of claim 1, wherein the access server is a broadband remote access server connected to at least one of the following:
   a Digital Subscriber Line Access Multiplexer (DSLAM), or an edge router.

3. The method of claim 1, wherein the tunneling protocol is Point-to-Point Protocol over Ethernet (PPPoE).

4. The method of claim 1, wherein the SP indication received from the at least one CPE is an Internet Protocol (IP) address.

5. The method of claim 1, wherein the routing the user data further includes providing an Internet Protocol (IP) address to the at least one CPE.

6. The method of claim 1, wherein the routing the user data further includes authenticating the at least one CPE to the access server.

7. The method of claim 1, further comprising:
   generating billing records at the access server based on network usage of the at least one CPE.

8. The method of claim 1, wherein the routing the user data is performed via an Internet Protocol (IP) connection over at least one of the following protocols:
Synchronous Optical NETworking (SONET),
Asynchronous Transfer Mode (ATM), or
Ethernet.

9. The method of claim 1, wherein the at least one SP is a voice server.

10. The method of claim 1, wherein the at least one SP is a video server.

11. The method of claim 1, wherein the sessions and signaling from the at least one CPE include user data associated with each of the at least one CPE.

12. An access server connected to a plurality of network termination (NT) points and at least one service provider (SP), wherein each of the plurality of NT points is associated with at least one customer premises equipment (CPE), the access server comprising:
an access server function configured to:
multiplex user data destined to the at least one CPE;
communicate the multiplexed user data destined to the at least one CPE from the access server to a respective one of the plurality of NT points over a single permanent virtual connection; and
receive user data originating from the at least one CPE from the respective one of the plurality of NT points over the single permanent virtual connection, wherein a tunneling protocol between the respective one of the plurality of NT points and the access server combines sessions and signaling from the at least one CPE into a single tunnel; and
a routing function configured to route the user data originating from the at least one CPE to at least one SP selected from the at least one SP using an integrated signaling protocol between the at least one CPE and the access server based on a SP indication received from the at least one CPE.

13. The access server of claim 12, wherein the access server is a broadband remote access server connected to at least one of the following:
a Digital Subscriber Line Access Multiplexer (DSLAM), or
an edge router.

14. The access server of claim 12, wherein the tunneling protocol is Point-to-Point Protocol over Ethernet (PPPoE).

15. The access server of claim 12, wherein the SP indication received from the at least one CPE is an Internet Protocol (IP) address.

16. The access server of claim 12, wherein the routing function is further configured to provide an Internet Protocol (IP) address to the at least one CPE.

17. The access server of claim 12, wherein the access server function is further configured to authenticate the at least one CPE to the access server.

18. The access server of claim 12, wherein the access server function is further configured to generate billing records at the access server based on network usage of the at least one CPE.

19. The access server of claim 12, wherein the routing function is further configured to route the user data via an Internet Protocol (IP) connection over at least one of the following protocols:
Synchronous Optical NETworking (SONET),
Asynchronous Transfer Mode (ATM), or
Ethernet.

20. The access server of claim 12, wherein the at least one SP is a voice server.

21. The access server of claim 12, wherein the at least one SP is a video server.

22. The access server of claim 12, wherein the sessions and signaling from the at least one CPE include user data associated with each of the at least one CPE.

* * * * *